US007174010B2

(12) United States Patent
McIlwaine et al.

(10) Patent No.: US 7,174,010 B2
(45) Date of Patent: Feb. 6, 2007

(54) SYSTEM AND METHOD FOR INCREASING COMPLETION OF TRAINING

(75) Inventors: John C. C. McIlwaine, Alpharetta, GA (US); Matthew G. A. McConnell, Alpharetta, GA (US); Surj Ramlogan, Woodstock, GA (US)

(73) Assignee: Knowlagent, Inc., Alpharetta, GA (US)

( * ) Notice: Subject to any disclaimer, the term of this patent is extended or adjusted under 35 U.S.C. 154(b) by 521 days.

(21) Appl. No.: 10/251,320

(22) Filed: Sep. 20, 2002

(65) Prior Publication Data

US 2003/0086555 A1 May 8, 2003

Related U.S. Application Data

(60) Provisional application No. 60/338,522, filed on Nov. 5, 2001.

(51) Int. Cl.
 *H04M 3/00* (2006.01)
(52) U.S. Cl. ............... 379/265.01; 379/265.02; 379/265.05; 379/266.07; 434/320; 434/321; 434/322; 434/323
(58) Field of Classification Search ........... 379/265.01, 379/265.02, 265.05, 266.07; 434/320, 321, 434/322, 323
See application file for complete search history.

(56) References Cited

U.S. PATENT DOCUMENTS

| | | | |
|---|---|---|---|
| 3,245,157 A | 4/1966 | Laviana | 434/307 R |
| 3,594,919 A | 7/1971 | De Bell et al. | 434/319 |
| 3,705,271 A | 12/1972 | De Bell et al. | 360/74.4 |
| 4,684,349 A | 8/1987 | Ferguson et al. | 434/308 |
| 4,776,016 A | 10/1988 | Hansen | 704/275 |
| 4,853,952 A | 8/1989 | Jachmann et al. | 379/88.11 |
| 4,916,726 A | 4/1990 | Morley et al. | 379/88.13 |
| 5,058,008 A | 10/1991 | Schumacher | 705/9 |
| 5,100,329 A | 3/1992 | Deesen et al. | 434/327 |

(Continued)

FOREIGN PATENT DOCUMENTS

WO  WO 98/22864  5/1998

(Continued)

OTHER PUBLICATIONS

*ACTV Net Debuts eSchool Online*; Business Wire; Mar. 24, 1997; pp. 03241287.

(Continued)

*Primary Examiner*—Wing Chan
*Assistant Examiner*—Quynh H. Nguyen
(74) *Attorney, Agent, or Firm*—King & Spalding LLP

(57) ABSTRACT

Improving the frequency with which agents complete training in a call center or other constituent contact environment. Agents working in call centers are typically given periodic training to improve their skills. Training breaks are scheduled at various times throughout the day that can depend on the workload of the call center. However, often times the agents are unable to receive or complete their training during the scheduled training break due to unexpected work loads and other interruptions. The present invention enables monitoring and recording of whether training is received and completed during a training break. If the training was not completed, the training break is stored and rescheduled for a later time. The invention also facilitates completion of missed training breaks by providing spontaneous training breaks during periods of unexpectedly lower workload at the call center.

24 Claims, 5 Drawing Sheets

U.S. PATENT DOCUMENTS

| | | | |
|---|---|---|---|
| 5,110,329 A | 5/1992 | Pieper | 55/351 |
| 5,199,062 A | 3/1993 | Von Meister et al. | 379/88.04 |
| 5,206,903 A | 4/1993 | Kohler et al. | 379/265.12 |
| 5,228,859 A | 7/1993 | Rowe | 434/118 |
| 5,239,460 A | 8/1993 | LaRoche | 705/11 |
| 5,278,898 A * | 1/1994 | Cambray et al. | 379/266.1 |
| 5,299,260 A | 3/1994 | Shaio | 379/266.07 |
| 5,309,505 A | 5/1994 | Szlam et al. | 379/88.01 |
| 5,310,349 A | 5/1994 | Daniels et al. | 434/350 |
| 5,311,422 A | 5/1994 | Loftin et al. | 703/2 |
| 5,384,841 A | 1/1995 | Adams et al. | 379/266.04 |
| 5,416,694 A | 5/1995 | Parrish et al. | 705/8 |
| 5,469,491 A | 11/1995 | Morley et al. | 379/88.13 |
| 5,499,291 A * | 3/1996 | Kepley | 379/265.06 |
| 5,511,112 A | 4/1996 | Szlam | 379/266.06 |
| 5,513,308 A | 4/1996 | Mori | 715/707 |
| 5,533,115 A | 7/1996 | Hollenbach et al. | 379/221.11 |
| 5,535,256 A | 7/1996 | Maloney et al. | 379/309 |
| 5,583,965 A | 12/1996 | Douma et al. | 704/275 |
| 5,590,188 A | 12/1996 | Crockett | 379/265.02 |
| 5,594,791 A | 1/1997 | Szlam et al. | 379/265.09 |
| 5,597,312 A | 1/1997 | Bloom et al. | 434/362 |
| 5,633,924 A | 5/1997 | Kaish et al. | 379/266.03 |
| 5,659,768 A | 8/1997 | Forbes et al. | 715/517 |
| 5,675,637 A | 10/1997 | Szlam et al. | 379/142.17 |
| 5,696,811 A | 12/1997 | Maloney et al. | 379/265.07 |
| 5,703,943 A | 12/1997 | Otto | 379/265.11 |
| 5,721,770 A | 2/1998 | Kohler | 379/265.12 |
| 5,727,950 A | 3/1998 | Cook et al. | 434/350 |
| 5,738,527 A | 4/1998 | Lundberg | 434/322 |
| 5,745,109 A | 4/1998 | Nakano et al. | 715/838 |
| 5,757,644 A | 5/1998 | Jorgensen et al. | 700/83 |
| 5,790,798 A | 8/1998 | Beckett et al. | 709/224 |
| 5,818,907 A | 10/1998 | Maloney et al. | 379/32.01 |
| 5,825,869 A | 10/1998 | Brooks et al. | 379/265.12 |
| 5,827,071 A | 10/1998 | Sorensen et al. | 434/323 |
| 5,833,468 A | 11/1998 | Guy et al. | 434/350 |
| 5,861,881 A | 1/1999 | Freeman et al. | 715/500.1 |
| 5,877,954 A | 3/1999 | Klimasauskas et al. | 700/29 |
| 5,903,641 A | 5/1999 | Tonisson | 379/265.12 |
| 5,904,485 A | 5/1999 | Siefert | 434/322 |
| 5,911,134 A | 6/1999 | Castonguay et al. | 705/9 |
| 5,914,951 A | 6/1999 | Bentley et al. | 370/352 |
| 5,915,973 A | 6/1999 | Hoehn-Saric et al. | 434/350 |
| 5,937,037 A | 8/1999 | Kamel et al. | 379/88.19 |
| 5,943,416 A | 8/1999 | Gisby | 379/265.13 |
| 5,946,375 A | 8/1999 | Pattison et al. | 379/112.01 |
| 5,946,387 A | 8/1999 | Miloslavsky | 379/265.12 |
| 5,947,747 A | 9/1999 | Walker et al. | 434/354 |
| 5,957,659 A | 9/1999 | Amou et al. | 415/178 |
| 5,963,635 A | 10/1999 | Szlam et al. | 379/309 |
| 5,971,271 A | 10/1999 | Wynn et al. | 235/380 |
| 5,991,394 A | 11/1999 | Dezonno et al. | 379/265.09 |
| 6,014,134 A | 1/2000 | Bell et al. | 715/705 |
| 6,038,544 A | 3/2000 | Machin et al. | 705/11 |
| 6,039,575 A | 3/2000 | L'Allier et al. | 434/323 |
| 6,044,355 A | 3/2000 | Crockett et al. | 705/8 |
| 6,044,368 A | 3/2000 | Powers | 707/2 |
| 6,052,460 A | 4/2000 | Fisher et al. | 379/265.12 |
| 6,058,163 A | 5/2000 | Pattison et al. | 379/265.06 |
| 6,067,537 A | 5/2000 | O'Connor et al. | 706/47 |
| 6,067,538 A | 5/2000 | Zorba et al. | 706/47 |
| 6,070,142 A | 5/2000 | McDonough et al. | 705/7 |
| 6,073,127 A | 6/2000 | Lannert et al. | 706/45 |
| 6,078,894 A | 6/2000 | Clawson et al. | 705/11 |
| 6,086,381 A | 7/2000 | Downs et al. | 434/322 |
| 6,108,687 A | 8/2000 | Craig | 709/203 |
| 6,118,865 A | 9/2000 | Gisby | 379/265.02 |
| 6,118,973 A | 9/2000 | Ho et al. | 434/362 |
| 6,119,097 A | 9/2000 | Ibarra | 705/11 |
| 6,128,380 A | 10/2000 | Shaffer et al. | 379/265.01 |
| 6,134,539 A | 10/2000 | O'Connor et al. | 706/45 |
| 6,141,528 A | 10/2000 | Remschel | 434/350 |
| 6,144,971 A | 11/2000 | Sunderman et al. | 715/500 |
| 6,146,148 A | 11/2000 | Stuppy | 434/322 |
| 6,149,441 A | 11/2000 | Pellegrino et al. | 434/350 |
| 6,155,840 A | 12/2000 | Sallette | 434/323 |
| 6,163,607 A | 12/2000 | Bogart et al. | 379/226.01 |
| 6,170,014 B1 | 1/2001 | Darago et al. | 709/229 |
| 6,171,109 B1 | 1/2001 | Ohsuga | 434/118 |
| 6,192,122 B1 | 2/2001 | Flockhart et al. | 379/266.01 |
| 6,201,948 B1 | 3/2001 | Cook et al. | 434/350 |
| 6,211,451 B1 | 4/2001 | Tohgi et al. | 84/470 R |
| 6,215,865 B1 | 4/2001 | McCalmont | 379/212.01 |
| 6,263,049 B1 | 7/2001 | Kuhn | 379/32.01 |
| 6,275,812 B1 | 8/2001 | Haq et al. | 705/11 |
| 6,278,777 B1 | 8/2001 | Morley et al. | 379/265.02 |
| 6,278,978 B1 | 8/2001 | Andre et al. | 705/9 |
| 6,289,340 B1 | 9/2001 | Puram et al. | 707/5 |
| 6,301,573 B1 | 10/2001 | McIlwaine et al. | 706/61 |
| 6,324,282 B1 | 11/2001 | McIlwaine et al. | 379/265.06 |
| 6,340,977 B1 | 1/2002 | Lui et al. | 715/709 |
| 6,347,139 B1 | 2/2002 | Fisher et al. | 379/265.12 |
| 6,356,632 B1 * | 3/2002 | Foster et al. | 379/265.04 |
| 6,359,982 B1 * | 3/2002 | Foster et al. | 379/266.06 |
| 6,371,765 B1 | 4/2002 | Wall et al. | 434/224 |
| 6,408,064 B1 | 6/2002 | Fedorov et al. | 379/265.06 |
| 6,408,066 B1 | 6/2002 | Andruska et al. | 379/265.12 |
| 6,453,038 B1 | 9/2002 | McFarlane et al. | 379/265.05 |
| 6,459,787 B2 | 10/2002 | McIlwaine et al. | 379/265.06 |
| 6,510,221 B1 | 1/2003 | Fisher et al. | 379/265.12 |
| 6,535,600 B1 | 3/2003 | Fisher et al. | 379/265.12 |
| 6,553,114 B1 | 4/2003 | Fisher et al. | 379/265.12 |
| 6,559,867 B1 | 5/2003 | Kotick et al. | 715/771 |
| 6,584,192 B1 | 6/2003 | Agusta | 379/265.12 |
| 6,603,854 B1 | 8/2003 | Judkins et al. | 379/265.06 |
| 6,628,777 B1 | 9/2003 | McIlwaine et al. | 379/265.06 |
| 6,690,788 B1 | 2/2004 | Bauer et al. | 379/242 |
| 6,771,764 B1 * | 8/2004 | Dezonno et al. | 379/265.02 |
| 6,771,765 B1 | 8/2004 | Crowther et al. | 379/265.09 |
| 6,775,377 B2 | 8/2004 | McIlwaine et al. | 379/265.06 |
| 6,865,267 B2 | 3/2005 | Dezonno | 379/265.06 |
| 2002/0118220 A1 | 8/2002 | Lui et al. | 715/709 |
| 2003/0033184 A1 | 2/2003 | Benbassat et al. | 705/8 |

FOREIGN PATENT DOCUMENTS

| | | |
|---|---|---|
| WO | WO 2000/68769 | 11/2000 |
| WO | WO 01/065525 A2 | 9/2001 |
| WO | WO 2005/011240 A1 | 2/2005 |
| WO | WO 2005/011243 A1 | 2/2005 |
| WO | WO 2005/020546 A2 | 3/2005 |

OTHER PUBLICATIONS

Armstrong, *Electronic Mail Order for Distance Learning*; IEEE Colloquium on Commercialising the Internet; pp. 4/1-4/4; Feb. 1997.

Call Center E-Journal; *Telvista Integrates eLearning and Quality Monitoring*; Aug. 2001; pp. 8-12.

Click2learn; *Click2learn Unveils New Platform; Takes Aim at e-Learning Industry's Shortcomings*; Press Release; Jun. 4, 2001.

Click2learn; *Aspen: The Next-Generation e-Learning Platform*; (2001).

Curilem et al.; *Considerations for the Design of a Tutoring System Applied to Diabetes*; Proceedings of the 22nd Annual EMBX International Conference; Jul. 23-28, 2000; pp. 2811-2814.

Cybulski et al.; *Teaching Systems Analysis and Design Using Multimedia and Patterns*; IEEE; 2000; pp. 113-122.

Envision Telephony; *Click2Coach*; (2001).

Envision Telephony; *What Makes Your Contact Center Agents Truly Effective*; (2001).

Fletcher, Scotty; *Companies turn to the Virtual Classroom*; dbusiness.com; May 25, 2000.

Granić et al.; *User Interface Aspects of an Intelligent Tutoring System*; 22nd Int. Conf. Information Technology Interfaces ITI 2000, Jun. 13-16, 2000; pp. 157-164.

NICE Systems; *NICE to Launch Integrated e-Learning Solution Through Partnership With Astound*; News Release; Dec. 4, 2000.

Skowronek, Larry; *Aspect eWorkforce Management v6*; Jul. 30, 2001.

Levinson et al.; *Chess Neighborhoods, Function Combination, and Reinforcement Learning*; Institution of Electrical Engineers; 2003; INSPEC Abstract No. C2002-07-7830D-012.

Affidavit of John McIlwaine dated Sep. 20, 2004.

Star Trainer; *Simulation Training for Call Center Agents*.

Knowlagent; *Knowlagent r7 Capabilities and Technologies Overview*; Jun. 10, 2004; pp. 1-20.

Knowlagent; Marketing document from website; www.knowlagent.com; (Aug. 2004).

Deloitte & Touche; *Tech Trends—2002 Annual Report*; (2002); vol. 1; pp. 23-26.

Knoa Software, Inc.; *Achieving Enterprise Application ROI by Managing User Performance*; Mar. 2003; pp. 1-12.

Knoa Software, Inc.; *Driving ROI From On-Demand Services*; Oct. 2003; 6 Pages.

Knoa Software, Inc.; *The knoa Guidance™ Application*; Apr. 2003; pp. 1-12.

\* cited by examiner

SYSTEM AND METHOD FOR INCREASING COMPLETION OF TRAINING

RELATED APPLICATIONS

The present application claims priority to U.S. provisional patent application entitled "System and Method for improving Adherence to Training Schedules" filed on Nov. 5, 2001 and assigned Ser. No. 60/338,522. The present application also incorporates by reference U.S. Pat. No. 6,324,282 entitled "Method and System for Delivery of Individualized Training to Call Center Agents", filed on Mar. 2, 2000, and U.S. patent application entitled "Method and System for Scheduled Delivery of Training to Call Center Agents", filed Mar. 6, 2000 and assigned Ser. No. 09/442,207.

FIELD OF THE INVENTION

The present invention relates generally to call centers for managing customer communications and, more specifically, to improving adherence to training schedules so that agents receive adequate training breaks.

BACKGROUND OF THE INVENTION

A call center is a system that enables a staff of call center agents to service telephone calls to or from customers or other constituents of an organization. Typically, calls are distributed and connected to agents that are available at the time of the call or are otherwise most suited to handle the call. The call-distribution function, commonly referred to as automatic call distribution ("ACD"), is generally implemented in software that executes in a switching system, such as a private branch exchange, that connects customer calls to agent telephones. A workforce management ("WFM") component is often employed by a call center to schedule and manage agent staffing and call center capacity.

More recently, computer-telephony integration ("CTI") has been widely employed in call centers. In a typical call center, a CTI component conveys telephony information, such as the telephone number of the calling party and the identity of the agent to whom the call is connected, from the ACD switching system to other components of the call center system. The other components of the call center system typically use this information to send relevant database information, such as the account file of the calling party, across a local area network ("LAN") or other communications network to a data terminal of the agent to whom the call is connected. The CTI component, other system components, and the LAN can also be used to deliver other information to the agents.

More generally, the business function provided by a call center may be extended to other communications media and to contact with constituents of an organization other than customers. For example, an e-mail help desk may be employed by an organization to provide technical support to its employees. Web-based "chat"-type systems may be employed to provide information to sales prospects. When a broadband communications infrastructure is more widely deployed, systems for the delivery of broadband information, such as video information, to a broad range of constituents through constituent contact centers will likely be employed by many organizations.

Agents in call centers and other constituent contact centers must be well-trained in order to maximize their productivity and effectiveness. Agent training must be intensive and frequent in centers that handle complex interactions with constituents or that change call scripts or other interaction programs often. In many situations, the quality and effectiveness of agent training may significantly drive the performance of the call center.

In conventional call centers, training is provided to call center agents through a variety of mechanisms. The supervisor of the call center may simply walk over to individual agents, or place telephone calls to the individual agents, and pass on new information to the agents personally. New information may be distributed by email, by an instructor in a classroom setting, or over an intranet. Alternatively, the information may be broadcast over a public announcement system or may be displayed on a large wall display at the front of the call center. New information may also be provided through a "chair drop" by which written information updates or training materials are handed to the agents for their consumption.

More recently, automated methods for agent training and information updating have been developed. Computer-based training ("CBT") involves the distribution of training programs to an agent's computer desktop, to a dedicated terminal, or to a classroom. CBT may be distributed in a broadcast mode, with each agent receiving the same training at the same time. CBT can also allow individual agents to access training when convenient. Training materials can be tailored to each agent's particular needs and skills shortcomings.

One way that call centers integrate training and workload is to schedule periodic training breaks or information breaks. It is during these breaks that information is delivered to the agents. Training breaks can be scheduled by the WFM component at varying times throughout the workday. The WFM component can ensure that training breaks are scheduled during times that there are a sufficient number of agents to manage the call center workload.

Despite the ability of the WFM component to schedule training breaks for agents, one common problem with CBT systems is that agents are often unable to complete the training or other material provided during a training break. For example, the workload may be greater than anticipated requiring agents to prematurely end or completely forego a training break. Also, agents may be distracted by other activities and be unable to complete a scheduled training break.

The fulfillment of training breaks is a critical factor in the successful operation of a call center. The characteristic describing whether agents are completing training breaks as scheduled is generally referred to as adherence. A common problem in many conventional call centers is low adherence to training break schedules. Low adherence results in agents who are ill-equipped to perform their jobs. Accordingly, a need exists to improve agent adherence to training break schedules. A further need exists to be able to monitor agent activities and track whether training breaks are completed. Finally, a need exists to be able to reschedule missed training breaks to improve agent skills and increase call center adherence to training schedules.

SUMMARY OF THE INVENTION

The present invention supports the provision of training to agents in a call center or other type of constituent contact environment. Training is transmitted during scheduled training breaks over a communications network to agents in a call center. The training component monitors the training break to determine if the agent actually completes the training. If training is completed, a record is maintained that the agent has completed the training break. If the training is not completed, the training break is stored for rescheduling with the agent during another time. The invention also enables scheduling of spontaneous training breaks during periods of low workload. Scheduling spontaneous training breaks allows agents to capture previously missed or unfinished training breaks and enhance their skills.

According to one aspect of the invention, the training system can monitor a call center agent to determine whether the agent completes a training break. If the training break is completed, it is removed from a list of pending training breaks. If the training break is not completed, it will remain on the list of pending training breaks so that it can be rescheduled for another time. The training system can compile the list of pending training breaks from newly designated training breaks and from incomplete training breaks that need to be rescheduled. Before delivering a training break, the training system can monitor the workload of the call center and monitor the current activities of the agent that is to receive the training break. Assuming that the call center workload volume is acceptable and the agent is not occupied, the training system can deliver a training break from the list of pending training breaks. After the training break is terminated, the training system determines whether or not the training break was completed. The training system can also share the completion data with a workforce management component responsible for scheduling work and training for the entire call center.

Another aspect of the invention provides a method for scheduling spontaneous training breaks during periods of low workload volume in the call center. Call center work schedules are typically created based on a predicted call volume. The training system can receive data describing the current workload volume of the call center and monitor for periods of low call volume. The training system can take advantage of low workload periods by assigning training breaks to idle agents. By prioritizing the pending training breaks chronologically or based on the agent most in need of training, the training system can select which agent should receive a spontaneous training break. The training system can also monitor a spontaneous training break to determine whether it is completed and use this information for rescheduling incomplete training breaks.

In yet another aspect, the invention provides a system for improving the completion rate of agent training. The system comprises a training component that can be coupled to a communication system of a call center. The training component can receive workload data from an automatic call distribution component and examine the data for periods of low workload volume. The training component can advantageously use the periods of low workload volume for scheduling spontaneous training breaks. The spontaneous training breaks can be monitored by the training component, just as a regularly scheduled training break, to determine whether it has been completed. Incomplete training breaks can be maintained on a list of pending training breaks for rescheduling at a later time.

These and other aspects of the invention will be described below in connection with the drawing set and the appended specification and claim set.

DETAILED DESCRIPTION OF THE EXEMPLARY EMBODIMENTS

The present invention is directed to ensuring that agents maximize their access to training breaks to ensure that they are well-prepared to perform their jobs. Training breaks are time periods throughout the workday that agents can temporarily stop responding to constituents and instead, can receive information via the communications network. During the training breaks, training materials or other information, can be provided to a constituent contact agent, such as a call center agent. The information provided during training breaks can encompass training materials, schedules, work policies, notices, and any other information that can be transmitted over a communications network. Although the preferred embodiment of the invention will be described with respect to the scheduling of training breaks for an agent in a call center, those skilled in the art will recognize that the invention may be utilized in connection with the assignment of a variety of information and tasks in other operating environments. One example other than the typical call center environment is a technical support center within an organization that serves employees or members. Turning now to the drawings, in which like numerals indicate like elements throughout the several figures, an exemplary embodiment of the invention will be described in detail.

Figure 1A:
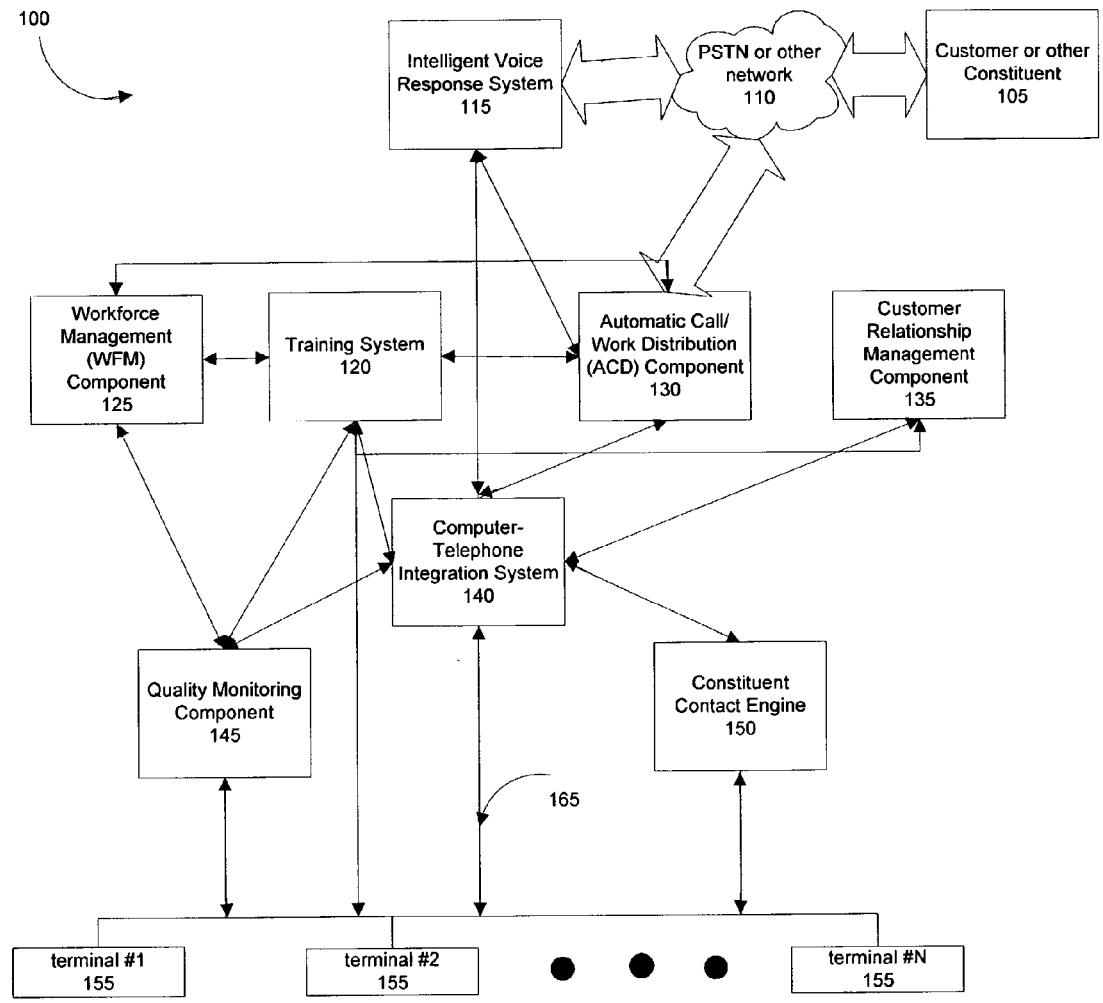
FIG. 1A is a block diagram illustrating a system for managing a computer-based customer call center system in accordance with an exemplary embodiment of the present invention.

FIG. 1A illustrates a computer system for managing a call center in which one advantageous embodiment of the present invention is implemented. A call center 100 includes a training system 120 operative to assign and deliver training breaks to call center agents operating terminals 155. In a typical application of the call center 100, a customer or other constituent 105, calls via the public switched telephone network ("PSTN") or other network 110 to the call center 100. The customer call may be initiated in order to sign up for long distance service, inquire about a credit card bill, or purchase a catalog item, for example. Through the PSTN 110, the call from the customer 105 reaches an Automatic Call Distribution ("ACD") component 130 of the call center. Alternatively, the call can be received by an intelligent voice response system 115 that allows the caller to select from a menu of options. In alternative embodiments of the invention, the function of the ACD can be replaced by other communications routers. For example, in a contact system using email, an email server and router can be used to distribute electronic messages.

The ACD component 130 functions to distribute calls from customers to each of a number of terminals 155 being operated by call center agents who have been assigned to answer customer calls, take orders from customers, or perform other interaction duties. Terminals 155 typically comprise a telephone and a call center computer terminal for accessing product information, customer information, or other information through a database. For example, in a call center implemented to support a catalog-based clothing merchant, the computer terminal for an agent could display information regarding a specific item of clothing when a customer 105 expresses an interest in purchasing that item.

Customer phone calls and relevant database information are integrally managed by modern call centers 100 through what is known as computer/telephone integration ("CTI"). A CTI system 140 coupled to the ACD component 130, enables the call center 100 to extract information from the phone call itself and to integrate that information with database information. For example, the calling telephone number of a customer 105 may be used in order to extract information regarding that customer stored in the call center database and to deliver that customer information to a terminal 155 for the agent's use in interacting with the customer. The CTI system 140 may also interact with the intelligent voice response system 115 to provide a touch-tone menu of options to a caller for directing the call to an appropriate agent.

A typical call center 100 includes a Workforce Management ("WFM") component 125. The WFM component 125 is used to manage the staffing level of agents in the call center 100 so that call center productivity can be optimized. For example, the volume of calls into or out of a call center 100 may vary significantly during the day, during the week, or during the month. The WFM component 125 preferably receives historical call volume data from the ACD component 130 and uses this information to create work schedules for agents. The historical call volume data can be used to predict periods of high call volume and work schedules can be adjusted to respond accordingly.

Through the use of the WFM component 125, the call center management can determine an appropriate level of staffing of agents so that call hold times are minimized, on the one hand, and so that agent overstaffing is avoided, on the other hand. Call center management can also use information from the WFM component 125 to staff the call center with agents having particular skills at a particular time. For example, if the mix of callers providing customer complaints and callers placing new orders varies significantly during the day, call center management can staff different shifts of call center agents with a different mix of skills to reflect that variation in call content.

In a typical call center, customer calls and interactions between customers 105 and agents are selectively sampled as part of a quality control program within the call center 100. This function is typically performed through a quality monitoring component 145. The training system 120 preferably accepts scores from the quality monitoring component 145, which enables call center management to review recorded agent/customer interactions and to evaluate agent performance during those interactions. For example, call center management can assess the level of skill of an agent in each of several skill areas. The relevant skill areas for a call center serving a catalog clothing merchant could include product configuration knowledge (e.g. color options), knowledge of shipping and payment options, knowledge of competitor differentiation, and handling an irate customer. The quality monitoring component 145 provides data to the training system 120 and gives call center management the ability to evaluate an agent's level of skill in each of several areas. Those areas in which an agent's skill are determined to be below predetermined performance thresholds are identified along with course assignments so that the training system 120 can provide training materials, during training breaks, that correspond to the agent's skill shortcomings.

The call center 100 includes a communications network 165 to interconnect and link the aforementioned components. For a call center in which all elements are located at the same site, a local area network may provide the backbone for the call center communications network i65. In call centers for which the elements are geographically dispersed, the communications network may comprise a wide area network, a virtual private network, a satellite communications network, or other communications network elements as are known in the art.

The training system 120, according to one advantageous embodiment of the present invention, is implemented in software and is installed in or associated with the communications network 165. Under the control of call center management, the training system 120 can assign training material to agents and deliver those training materials via communications network 165 to terminals 155 operated by the agents. Integration with the WFM component 125 and the ACD component 130 enables the training system 120 to deliver the training materials to agents at times when those agents are available and when training will not adversely impact call center performance.

The training system 120 is also in communication with the quality monitoring component 145 through the communications network 165 so that appropriate training materials may be delivered to agents who are most in need of training. Proficient agents are thus spared the distraction of unneeded training, and training can be concentrated on those agents most in need and on areas of greatest need for those agents. Advantageously, call center management may establish pass/fail or remediation thresholds to enable the assignment of appropriate training to appropriate agents. This functionality may be provided within the quality monitoring component 145. Preferably, agent skills that are found to be deficient relative to the thresholds are flagged and stored in a storage device within the quality monitoring component 145.

In another advantageous embodiment of the present invention, the training system 120 may be deployed on a stand-alone server located remotely from call center 100. For example, training system 120 could be deployed to serve a number of independent call centers 100, such as in a "web services" or application service provider business model. In such a remote deployment, the problems of integration with individual call center computer systems can be avoided and the training system 120 can be maintained at a single central location.

A wide range of agent training scenarios can be supported by the training system 120. The training materials that are appropriate for a particular call center application can vary widely according to the call center function. The subject matter of training materials may also vary widely; for example, training materials may be focused on product information, phone etiquette, problem resolution, or other subjects.

Figure 1B:
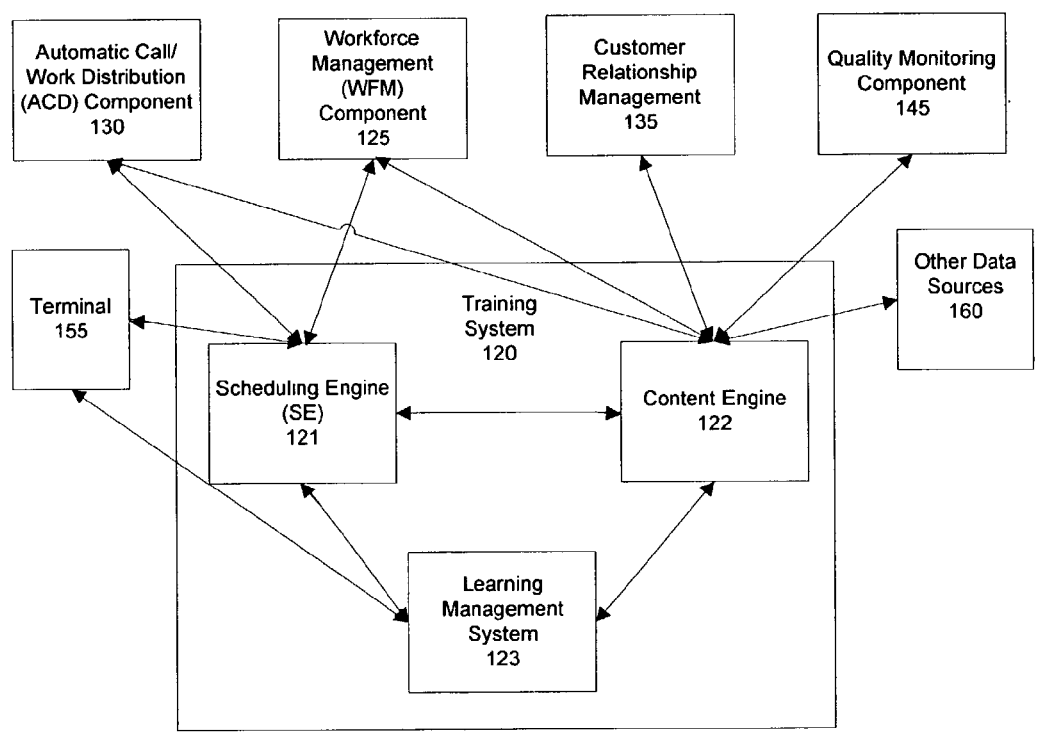
FIG. 1B is a block diagram illustrating a system for the assignment of training breaks in accordance with an exemplary embodiment of the present invention.

Referring to FIG. 1B, the components of an exemplary training system 120 for assigning and delivering training to call center agents are illustrated. The training system 120 comprises a number of interoperable software modules including a scheduling engine 121, a content engine 122, and a learning management system 123. The learning management system 123 provides a graphical user interface for the agent and allows the manager of a contact system 100 to control the types of training sent to agents and when that training is sent. The content engine 122, can select training or other information to send to an agent during a training break. An advantageous method and system for providing individualized content to an agent is disclosed in U.S. patent application Ser. No. 09/517,500, filed Mar. 2, 2000, which application is assigned to the assignee of the present application and is hereby incorporated by reference herein. As FIG. 1B illustrates, the content engine 122 can communicate with the other components of the contact system 100 to determine the type of content to send an agent.

The scheduling engine 121 schedules the training breaks that are delivered to an agent by the learning management system 123. A method and system for scheduled delivery of training is disclosed in U.S. patent application Ser. No. 09/442,207, filed Mar. 6, 2000, which application is assigned to the assignee of the present application and is hereby incorporated by reference herein. The scheduling engine 121 of the present invention may schedule training breaks during time periods provided by the workforce management component 125 or, alternatively, during periods of low workload for the call center 100. The scheduling engine 121 can verify the workload of the call center 100 by communicating in real time with the ACD component 130. Finally, the scheduling engine 121 can also communicate with the terminal 155 to determine whether an agent is free to receive a training break. Once a training break is delivered, the terminal 155 can be monitored by the scheduling engine 121 to determine whether the agent completes the training break. This information is then used by the scheduling engine 121 to reschedule unfinished training breaks. By tracking the completion of training breaks and rescheduling incomplete training breaks, the scheduling engine 121 is able to increase overall completion of training for the call center 100.

Figure 2A:
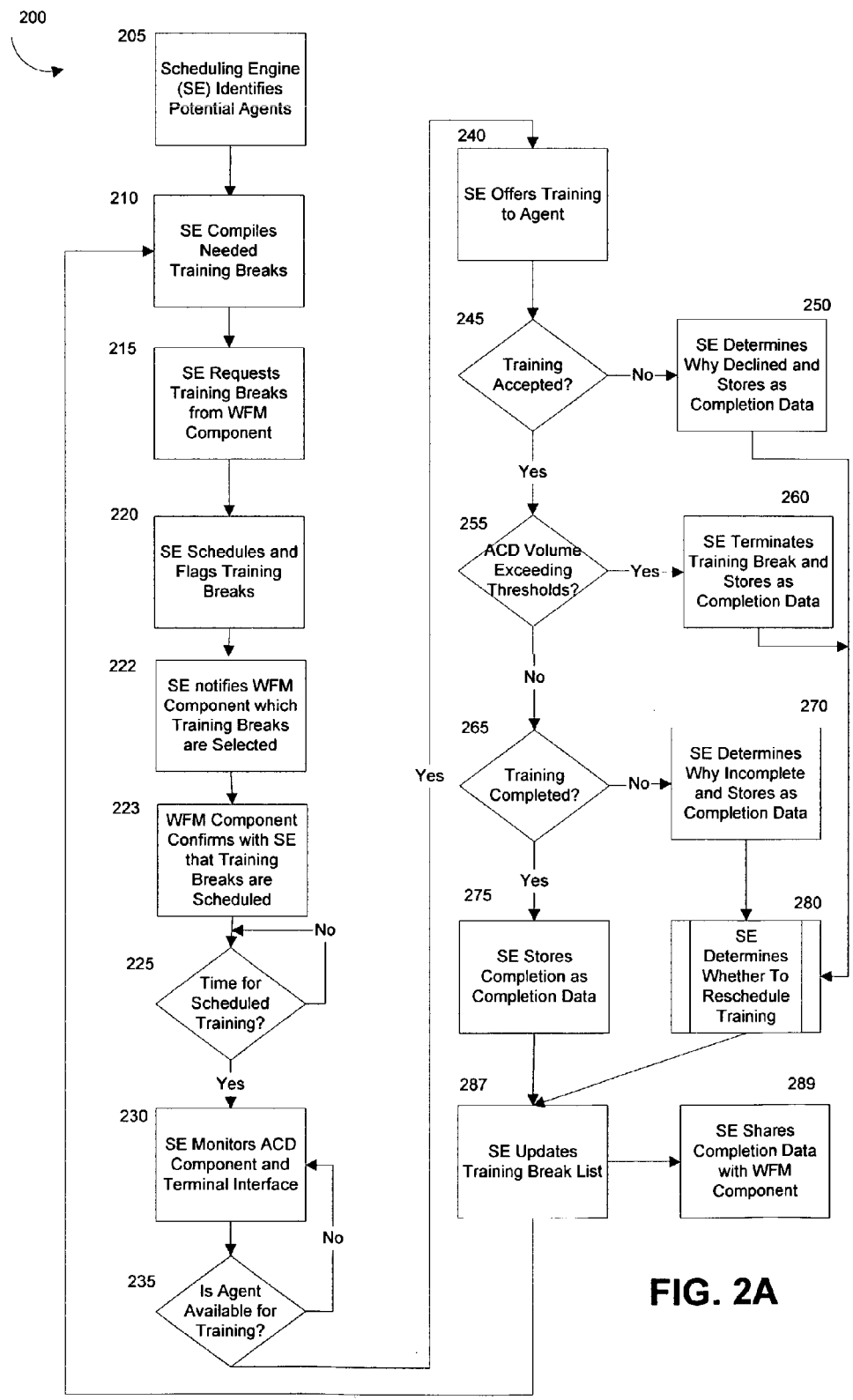
FIG. 2A is a flow chart indicating the steps in a method for monitoring and rescheduling training breaks for a contact agent in accordance with an exemplary embodiment of the present invention.

FIG. 2A is a flowchart showing the steps in an exemplary method 200 for delivering and monitoring the completion of training breaks. Beginning with step 205, the scheduling engine 121 identifies the agents operating terminals 155 to determine who may potentially receive a training break. As agents begin or end a shift, they will be added to or removed from the group that may potentially receive a training break. In step 210, the scheduling engine 121 compiles a list of training breaks that need to be scheduled. The scheduling engine's list of pending training breaks can comprise regularly scheduled training breaks for that day and incomplete training breaks that need to be rescheduled from previous days. The pending training breaks can also comprise specific training that a particular agent needs to receive.

The scheduling engine 121 then requests time periods for scheduling training breaks from the WFM component 125 in step 215. The WFM component 125 creates schedules for the agents of the call center 100 and can determine the appropriate times for scheduling training breaks. In an alternative embodiment of the invention, the scheduling engine 121 can create its own schedules of training breaks. In step 220, the scheduling engine 121 schedules as many of the pending training breaks as possible during the time periods provided by the WFM component 125. It may be that the WFM component 125 is unable to provide enough time periods for scheduling all of the pending training breaks. Accordingly, the scheduling engine 121 can prioritize training breaks and flag the ones on the pending list that have actually been scheduled. Training breaks can be prioritized based on the length of time they have been pending or the number that are pending for a particular agent, for example. In step 222, the scheduling engine 121 notifies the WFM component 125 which training breaks are selected and which agents will be receiving those training breaks. Finally, in step 223, the WFM component 125 confirms with the scheduling engine 121 that the selected training breaks are in fact scheduled.

The scheduling engine 121 waits until the scheduled time for delivering a training break in step 225. In determining whether to offer a training break to an agent, the scheduling engine 121 can verify with the ACD component 130 that the workload volume is at an acceptable level for delivering training breaks. The agent's terminal 155 can also be monitored and if the agent is available for training in step 235, the scheduling engine 121 will offer a training break to the agent in step 240. In step 245, the agent has the option of accepting or declining the training break. If the agent declines the training break, in step 250 the scheduling engine 121 will attempt to determine why it was declined and store this information as completion data for future use.

For example, an agent may decline the training break because she is occupied by other work in the call center 100. While the training break is being offered to the agent, the scheduling engine 121 continually checks with the ACD component to ensure that workload volumes are not exceeding the appropriate thresholds for delivering training. Call center management can determine the appropriate thresholds for delivering training so as to minimize constituent waiting times. If the threshold is exceeded in step 255, the scheduling engine 121 will terminate the training break in step 260. The fact that the training break had to be terminated will be stored as completion data and it can be determined in step 280 whether to reschedule the training break.

Assuming the workload threshold is not exceeded, the agent can proceed with the training break and if it is completed, in step 265, the scheduling engine 121 will store that information as completion data in step 275. Completion data can also include the time that the training break was completed and any reasons why it was not completed. If the agent is unable to complete the training break, the scheduling engine 121 attempts to determine why it was incomplete and stores this information as completion data in step 270. In step 280, the incomplete training breaks are collected and the scheduling engine 121 determines whether or not the training break should be rescheduled. The manager of the call center 100 can decide what percentage of incomplete training breaks should be rescheduled.

In step 287, the completion data is compared with the list of pending training breaks. Any pending training break on the list that has been flagged and has been completed will be removed from the list. Flagged training breaks that have not been completed and are set to be rescheduled will remain on the list. The scheduling engine 121 can also share the completion data with the WFM component 125 in step 289. Typically, software interface modules are used to determine the format and content of the completion data that the WFM component 125 receives. The WFM component 125 can use this data to determine what skills each agent has and how to schedule workloads. Returning to step 210 from step 287, the scheduling engine 121 compiles a new list of pending training breaks and can repeat the foregoing process for delivering additional training breaks to agents.

Figure 2B:
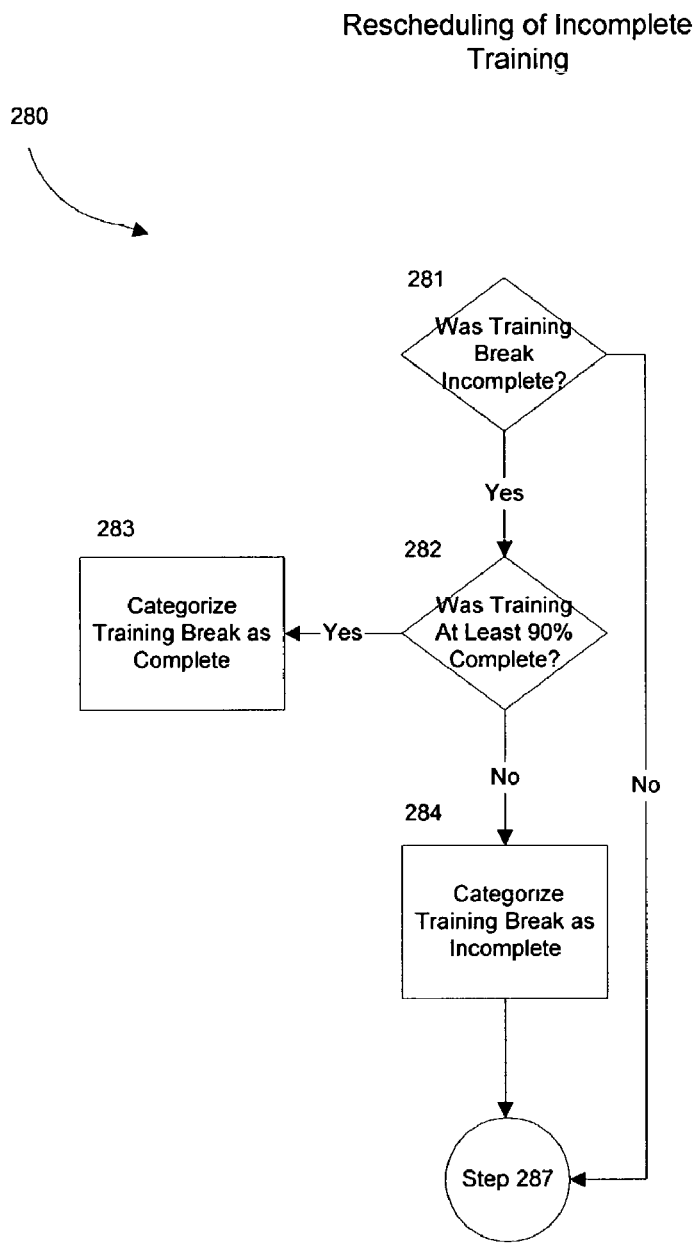
FIG. 2B is a flow chart illustrating the steps in a method for determining whether to reschedule a training break in accordance with an exemplary embodiment of the present invention.

FIG. 2B is a flowchart illustrating in greater detail the exemplary process described in step 280 of FIG. 2A. FIG. 2B demonstrates an exemplary method for determining whether to reschedule an incomplete training break. The scheduling engine 121 examines the adherence data collected from the terminal 155 to determine whether a training break should be rescheduled. If a training break is incomplete in step 281, the scheduling engine 121 will look to see how much of the training break the agent was able to complete. In the exemplary method shown in FIG. 2B, if the training break was at least 90% complete the agent is given credit for that training break and it will be categorized as being completed in step 283. If the training break is less than 90% complete then it will be categorized as incomplete and the training break will not be removed from the pending list. The 90% criteria in step 282 is an arbitrary value which can be adjusted by the manager of the call center 100. Once the incomplete training break has been categorized, the flowchart returns to step 287 of FIG. 2A for updating of the pending training break list.

Figure 3:
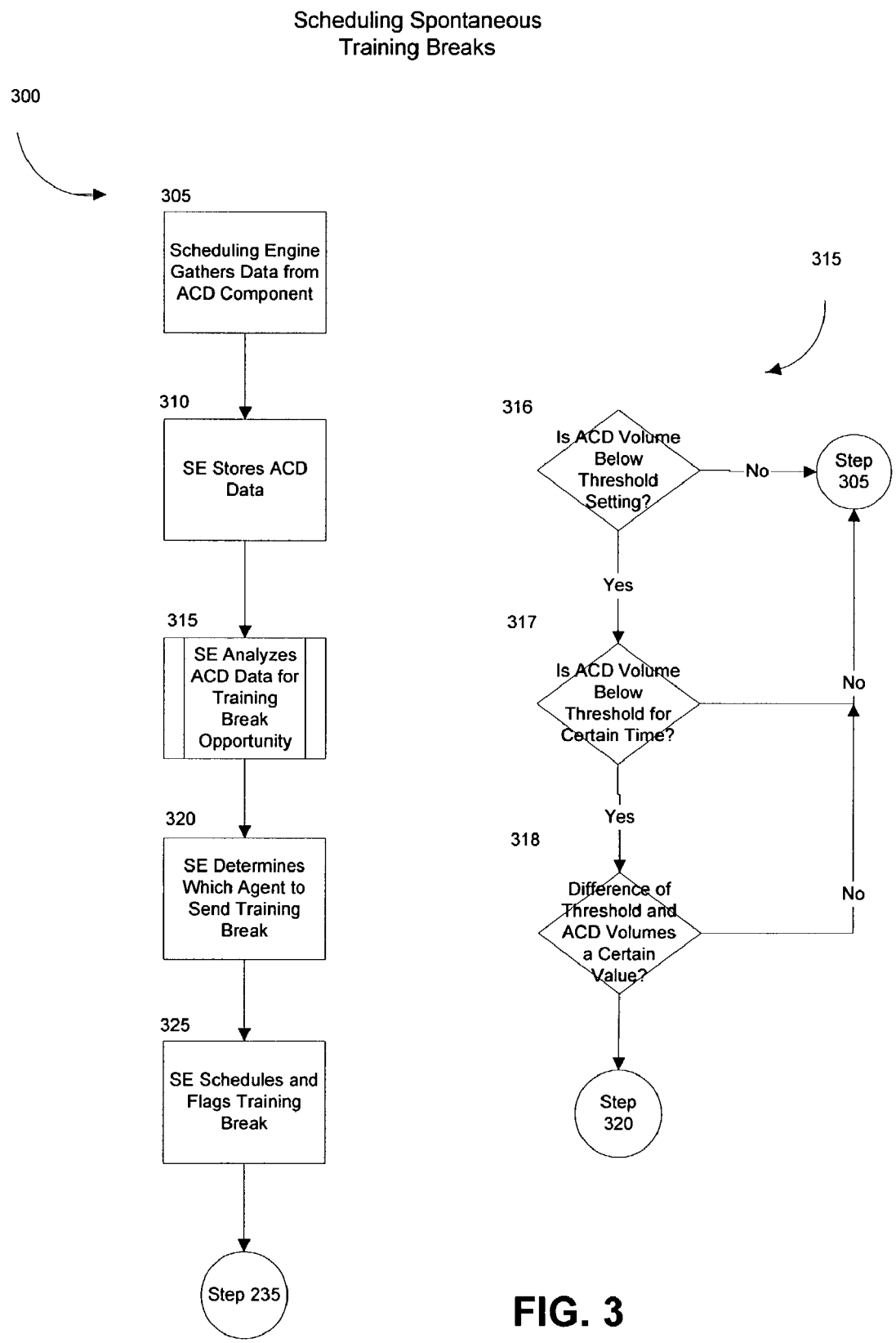
FIG. 3 is a flow chart diagram showing the steps in a method for determining when spontaneous training breaks can be provided to a contact agent in accordance with an exemplary embodiment of the present invention.

In addition to the typical method of scheduling pending training breaks with the WFM component, the present invention can also take advantage of periods of low workload. Supplying agents with incomplete training breaks or other pending training breaks during periods of low workload, enables the call center to improve completion rates for agent training. Referring to FIG. 3, an exemplary method 300 is illustrated for scheduling spontaneous learning breaks during periods of low workload. Beginning with step 305, the scheduling engine 121 gathers data from the ACD component 130. Because the ACD component 130 receives all incoming calls, the scheduling engine 121 can learn what the current call volume is for the call center 100. In step 310, the scheduling engine 121 will store this data from the ACD component 130 so that it can be examined over time.

In step 315, the scheduling engine 121 analyzes the data from the ACD component 130 for opportunities to deliver training breaks to agents. One exemplary method for analyzing the data is illustrated in steps 316 through 318. This exemplary method looks for downward trends in the workload volume that would indicate a period of time during which training breaks could be supplied to agents. Call centers typically have a predicted volume of calls that varies throughout the day based on historical data that has been collected. When the actual volume of calls is trending below this predicted volume, there may be agents with free time to receive training breaks.

In step 316, the scheduling engine 121 looks for a current ACD volume that is below a particular threshold setting. The call center management will typically select a threshold setting based on the predicted call volume for that time. If the actual volume has not dropped below this threshold setting, the scheduling engine 121 will merely continue to collect data from the ACD component 130 in step 305. However, if the volume is below this threshold setting, the scheduling engine 121 will then examine how long it remains below the threshold in step 317. If the unexpected low volume continues for a certain time and at a certain value below the threshold setting in step 318, then the scheduling engine 121 will proceed with delivering training breaks to idle agents. The threshold times and values can be selected by call center management based on priorities for training and responding to constituents. The foregoing method is merely an exemplary method for analyzing trends in the call center workload. Alternative embodiments of the invention may analyze other data, such as the types of calls the call center is receiving, in deciding whether to provide spontaneous training breaks.

Assuming the thresholds of the analysis in step 315 have been met, the scheduling engine 121 will determine which agents to send a training break to in step 320. Again, this determination can be controlled by the call center management as to which agents are most in need of training. In step 325, the scheduling engine 121 schedules the training breaks for delivery and flags all scheduled training breaks on the pending list. The exemplary process 300 then returns to step 235 of FIG. 2A where the scheduling engine 121 verifies whether the agent is free to begin receiving a training break.

In summary, the present invention supports monitoring of training breaks provided to agents in a call center or other constituent contact center. By monitoring the training breaks, a training system 120 can determine which training breaks are completed by agents and remove them from circulation. Training breaks that are not completed are stored for rescheduling with the agent at a later date. The present invention also enables spontaneous provision of pending training breaks during periods of low workload. By tracking and rescheduling incomplete training breaks, the number of training breaks that will be completed by the agents is increased and agents' skills are improved.

From the foregoing, it will be appreciated that the preferred embodiment of the present invention overcomes the limitations of the prior art described herein. From the description of the preferred embodiment, equivalents of the elements shown therein will suggest themselves to those skilled in the art, and ways of constructing other embodiments of the present invention will suggest themselves to practitioners of the art. Therefore, the scope of the present invention is to be limited only by the claims below.

What is claimed is:

1. In association with a computer system for managing a call center comprising a communications network, a method for improving completion of training for call center agents comprising the steps of:
   receiving a time slot for scheduling a training break;
   selecting the training break from a list of pending training breaks;
   determining whether one of the agents is available for receiving the selected training break during the time slot;
   if the agent is available, delivering the selected training break to the agent;
   monitoring whether the selected training break is completed; and
   if not completed, storing the selected training break for rescheduling, and
   if completed, removing the selected training break from the list of pending training breaks,
   wherein storing the selected training break comprises:
   determining whether a predefined condition exists in the call center;
   if the predefined condition is determined to exist, interrupting the selected training break;
   storing the interrupted training break; and
   rescheduling the interrupted training break based on predicted workload.

2. The method of claim 1, further comprising the step of identifying a specific agent for receiving the selected training break based on agent need.

3. The method of claim 1, wherein the receiving step further comprises receiving the time slot from a workforce management system that determines the time slot based on data from an automated call distribution system, and
   where the method further comprises the step of compiling the list of pending training breaks from newly designated training breaks and rescheduled training breaks.

4. The method of claim 1, further comprising the step of flagging the selected training break to indicate attempted delivery.

5. The method of claim 1, wherein the step of determining whether one of the agents is available further comprises evaluating a predicted workload of the call center.

6. The method of claim 1, further comprising the step of querying the agent to determine whether the agent desires delivery of the selected training break.

7. The method of claim 1, further comprising the step of storing whether the selected training break is completed in a work force management component.

8. A computer-implemented method for improving completion rates of training scheduled for agents of a call center, comprising the steps of:
monitoring a workload volume of the call center;
if the monitored workload volume meets a first predetermined criterion, selecting a training break from a list of pending training breaks to send to an agent of the call center and initiating delivery of the selected training break to the agent;
if the monitored workload volume meets a second predetermined criterion while delivery of the selected training break is ongoing, suspending delivery of the initiated training break;
scheduling delivery of the suspended training break;
monitoring whether a threshold amount of the training break is completed, wherein the threshold amount of the training break is less that the full training break;
if the threshold amount is not completed, marking the training break as incomplete; and
if the threshold amount is completed, removing the training break from the list of pending training breaks.

9. The method of claim 8, further comprising the step of prioritizing pending training breaks according to the length of time they have been pending.

10. The method of claim 8, further comprising the step of prioritizing pending training breaks according to the number of training breaks an agent has completed.

11. The method of claim 8, wherein at least one of the first predetermined criterion and the second predetermined criterion comprises a workload threshold.

12. The method of claim 8, further comprising the step of querying the agent to determine whether to deliver the training break.

13. The method of claim 8, further comprising the step of transmitting whether the training break is completed to a workforce management component.

14. The method of claim 8, wherein scheduling delivery of the suspended training break comprises scheduling based on information from a workforce management system that receives workload volume data of the call center from an automatic call distribution system.

15. The method of claim 8, wherein the monitored workload volume comprises workload of the agent.

16. In association with a computer system for managing a call center comprising a communications network, a method for improving completion of training for call center agents comprising the steps of:
monitoring workload volume for the call center;
if workload volume is below a first threshold, sending training content to an identified agent for review during a first break; and
if workload volume increases above a second threshold while the agent is reviewing the sent training content, interrupting review of the sent training content during, the first break and scheduling a second break for the agent to continue reviewing the sent training content.

17. The method of claim 6, further comprising the step of, in response to the workload increasing above the second threshold, storing at least a portion of the sent training content for review during the second break.

18. The method of claim 6, further comprising the step of in response to the workload increasing above the second threshold, storing at least a portion of the sent training content.

19. The method of claim 6, further comprising the step of prioritizing pending training breaks according to the length of time they have been pending.

20. The method of claim 6, further comprising the step of prioritizing pending training breaks according to the number of training breaks the agent has completed.

21. The method of claim 6, further comprising the step of querying the agent to determine whether to deliver the training break.

22. The method of claim 16, further comprising the step of transmitting whether the review of the training content is completed to a workforce management component.

23. The method of claim 16, wherein the first threshold is essentially equal to the second threshold.

24. The method of claim 16, further comprising the step of
in response to the workload volume increasing above the second threshold, using scheduling information provided by a workforce management component to schedule the second break,
wherein the workforce management component has produced the scheduling information using data provided by an automatic call distribution component.

* * * * *

UNITED STATES PATENT AND TRADEMARK OFFICE
CERTIFICATE OF CORRECTION

PATENT NO.       : 7,174,010 B2                                Page 1 of 1
APPLICATION NO.  : 10/251320
DATED            : February 6, 2007
INVENTOR(S)      : John McIlwaine et al.

It is certified that error appears in the above-identified patent and that said Letters Patent is hereby corrected as shown below:

Title Page, field 12, "McIlwaine et al" should read --McIlwaine et al.--.

Title Page, Field 75, "John C.C. McIlwaine" should read --John C.C. McIlwaine--.

Claim 8, column 11, line 23, "the training break is less that" should read --the training break is less than--.

Claim 17, column 12, line 14, "The method of claim 6" should read --The method of claim 16--.

Claim 18, column 12, line 18, "The method of claim 6" should read --The method of claim 16--.

Claim 19, column 12, line 22, "The method of claim 6" should read --The method of claim 16--.

Claim 20, column 12, line 25, "The method of claim 6" should read --The method of claim 16--.

Claim 21, column 12, line 28, "The method of claim 6" should read --The method of claim 16--.

Signed and Sealed this

Twenty-fourth Day of April, 2007

JON W. DUDAS
*Director of the United States Patent and Trademark Office*